US010652530B2

(12) United States Patent
Lee

(10) Patent No.: US 10,652,530 B2
(45) Date of Patent: May 12, 2020

(54) PARTICLE PROJECTION SPATIAL IMAGING SYSTEM

(71) Applicant: Edward Lee, Bengbu (CN)

(72) Inventor: Edward Lee, Bengbu (CN)

(73) Assignee: Edward Lee, Bengbu (CN)

( * ) Notice: Subject to any disclaimer, the term of this patent is extended or adjusted under 35 U.S.C. 154(b) by 0 days.

(21) Appl. No.: 16/274,729

(22) Filed: Feb. 13, 2019

(65) Prior Publication Data

US 2019/0379886 A1 Dec. 12, 2019

(30) Foreign Application Priority Data

Jun. 8, 2018 (CN) .......................... 2018 1 0587120

(51) Int. Cl.
*H04N 13/00* (2018.01)
*H04N 13/388* (2018.01)
(Continued)

(52) U.S. Cl.
CPC ........... *H04N 13/388* (2018.05); *G02B 30/56* (2020.01); *H05H 7/04* (2013.01); *H05H 13/005* (2013.01); *H05H 2007/046* (2013.01)

(58) Field of Classification Search
None
See application file for complete search history.

(56) References Cited

U.S. PATENT DOCUMENTS

| 3,555,349 | A | 1/1971 | Munz |
| 4,063,233 | A | 12/1977 | Rowe |
| 2017/0214909 | A1* | 7/2017 | Subrahmanyam ......................... G02B 27/2271 |

FOREIGN PATENT DOCUMENTS

| CN | 1088356 A | 6/1994 |
| CN | 2929889 Y | 8/2007 |
| (Continued) | | |

OTHER PUBLICATIONS

International Search Report and Written Opinion for PCT/CN2018/119809 dated Feb. 27, 2019.
(Continued)

*Primary Examiner* — Christopher G Findley
(74) *Attorney, Agent, or Firm* — Harness, Dickey & Pierce, P.L.C.

(57) ABSTRACT

The present invention provides a particle projection spatial imaging system, comprising a particle source for generating and accelerating a particle beam, a deflection coil set for deflecting the particle beam into a chronologically deployed dynamic 3D particle array, an exciting coil set for generating a magnetic field, and a scan control mechanism for controlling the particle source, the deflection coil set, and the particle exciting coil set. The particle projection spatial imaging system set forth by the present invention generates a 3D spatial image by generating and accelerating a particle beam by providing a particle source, deflecting the particle beam by using a deflection coil set to form a dynamic 3D particle array, and exciting particle bunches at corresponding pixel points in the array in a time-division manner by a particle exciting coil set to cause them to generate a radiation effect, and this particle projection spatial imaging system does not rely on a solid display medium, and can operate in the air and in vacuum. A 3D dynamic image can be generated by refreshing the scan control mechanism.

10 Claims, 3 Drawing Sheets

(51) Int. Cl.
*H05H 7/04* (2006.01)
*H05H 13/00* (2006.01)
*G02B 30/56* (2020.01)

(56) References Cited

FOREIGN PATENT DOCUMENTS

| | | |
|---|---|---|
| CN | 101013202 A | 8/2007 |
| CN | 102487445 A | 6/2012 |

OTHER PUBLICATIONS

First Office Action with a Search Report for the priority Chinese Application No. 2018105871204 was dated Dec. 4, 2019.
Science volume of modern science and technology popular encyclopedia, p. 72.

* cited by examiner

PARTICLE PROJECTION SPATIAL IMAGING SYSTEM

TECHNICAL FIELD

The present invention relates to the field of projection imaging technologies, and more particularly, to a particle projection spatial imaging system.

BACKGROUND ART

Current three-dimensional (3D) projection imaging technologies include spectroscopically stereoscopic display, volumetric 3D display, holographic 3D display, and the like. The spectroscopically stereoscopic display means that a retina receives two images with parallax, and by distinguishing between different areas of an object as to being bright/dark, being in front/in rear, and being near/far, one "sees" a stereoscopic object, which is usually realized by a polariscope, e.g. 3D stereoscopic glasses, 3D stereoscopic movies, and the like. The volumetric 3D display creates a 3D stereoscopic image with a true stereoscopic effect in a certain transparent solid from a plurality of two-dimensional images, by using techniques like high-speed motion of optics and high-frequency light projection, such as a volumetric 3D display. Both the spectroscopically stereoscopic display and the volumetric 3D display rely on a solid medium in achieving 3D display. The holographic 3D image display forms a complex holographic light field by interference of two light beams with each other; however, the holographic light field needs to be holographically recorded first, that is, information such as lightness of the object and the depth of field is recorded in a holographic material to form a hologram, and then reconstruction of 3D information is performed. Although dynamic display of a hologram is possible by using continuous films, the imaging angle of an image is still within the films.

SUMMARY OF INVENTION

It is an object of the present invention to provide a particle projection spatial imaging system, so as to solve the following technical problems existing in the prior arts: realization of the spectroscopically stereoscopic display and the volumetric 3D display rely on a solid, and projection of a holographic 3D film cannot be performed in the air.

To achieve the above object, the present invention adopts a technical solution of providing a particle projection spatial imaging system including a particle source for generating a particle beam and accelerating the particle beam, a deflection coil set for scanning the accelerated particle beam and deflecting it to form a dynamic 3D particle array, an exciting coil set for generating an exciting magnetic field, and a scan control mechanism for controlling the particle source, the deflection coil set and the particle exciting coil set, the exciting magnetic field generated by the exciting coil set exciting particles in the dynamic 3D particle array, and the particles, upon stimulated radiation, generating a luminous effect and generating pixel points, forming a spatial stereoscopic image due to persistence of vision of human eyes; and, a 3D particle array region located within the exciting magnetic field is a display region.

Furthermore, the deflection coil set includes a set of vertical yokes disposed in a first direction, and a set of horizontal deflection yokes disposed in a second direction, and the first direction and the second direction are set to be at a first predetermined included angle.

Furthermore, the particle projection spatial imaging system further includes a second particle accelerator disposed between the deflection coil set and the display region.

Furthermore, the second particle accelerator can be a linear accelerator, an electro-static accelerator, a laser accelerator, a multivoltage accelerator, or the like, and the second particle accelerator is used to compensate for a loss in energy of the particle beam after deflection by the deflection coils.

Furthermore, the display region has a back face for receiving the particle beam, a front face corresponding to the back face, and left, right, upper and lower sides adjacent to the back face, and the particle exciting coil set is disposed on one or more of the left, right, upper and lower sides and/or the front face of the display region.

Furthermore, the particle projection spatial imaging system further includes a vacuum casing that is vacuum inside, and the particle source and the second accelerator are all disposed in the vacuum casing.

Furthermore, a direction of the magnetic field generated by the particle exciting coil set is set to be at a second predetermined included angle with the particle beam.

Furthermore, the predetermined included angle is 90°.

Furthermore, the particle exciting coil set is a deflection magnet or an undulator.

Furthermore, the particle beam is an electron beam.

The particle projection spatial imaging system provided by the present invention has the following beneficial effects as compared with the prior arts: the particle projection spatial imaging system of the present invention generates and accelerates a particle beam by providing a particle source, and deflects the particle beam to form a dynamic 3D particle array using a deflection coil set, and the particle exciting coil set generates an exciting magnetic field in the display region to excite dynamic particles that currently reach a predetermined pixel point position to cause them to generate a radiation effect, forming a 3D stereoscopic image, which does not depend on a solid display medium. Moreover, the scan control mechanism can control the size, velocity, and energy of a particle bunch emitted by the particle source, and control the scan deflection coil set and the particle exciting coil set to adjust the deflection angle of the particle beam, the time when the particle beam reaches the display region, etc., thereby generating a 3D dynamic image.

BRIEF DESCRIPTION OF DRAWINGS

In order to more clearly explain the technical solutions in embodiments of the present invention, figures that are necessarily used in describing the embodiments or the prior arts will be briefly described below. It is obvious that the figures in the following description are merely some embodiments of the present invention, and for one ordinarily skilled in the art, from these figures other figures can be obtained without inventive labor.

Figure 1:
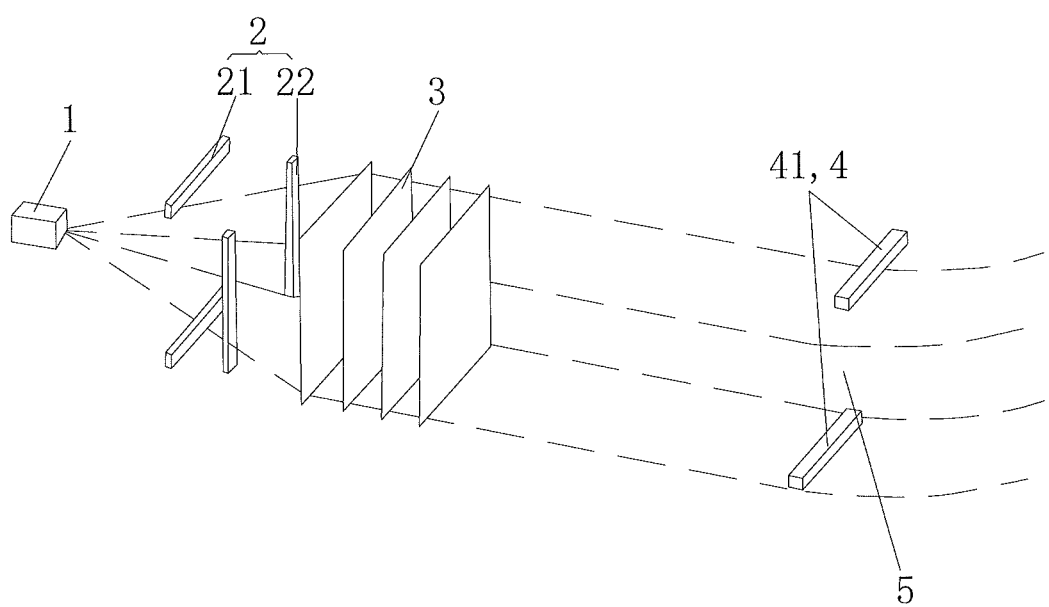
FIG. 1 is a schematic structural diagram I of a particle projection spatial imaging system according to an embodiment of the present invention.

In the figures, various reference numerals are as below:
1—particle source;
2—deflection coil set;
21—vertical yoke;
22—horizontal deflection yoke;
3—second particle accelerator;
4—exciting coil set;
41—undulator;
42—deflection magnet;
5—display region; and
6—3D image.

DESCRIPTION OF EMBODIMENTS

To make the problem to be solved by the present invention, the technical solution and the beneficial effects more clear, the present invention will be further described in detail below in combination with the accompanying drawings and embodiments. It is to be understood that the specific embodiments described herein are merely illustrative of the present invention, and are not intended to limit the present invention.

It should be stated that when an element is referred to as being "fixed to" or "disposed on" another element, it can be directly or indirectly on another element. When an element is referred to as being "coupled to" another element, it can be directly or indirectly coupled to another element.

It should be understood that the orientation or position relationships indicated by terms such as "length", "width", "upper", "lower", "front", "rear", "left", "right", "vertical", "horizontal", "top", "bottom", "inner" and "outer" are orientation or position relationships as shown based on the drawings, and they are merely for facilitating description of the present invention and simplifying the description, do not indicate or imply that the devices or elements referred to must have the particular orientation and be constructed and operated in the particular orientation, and thus are not to be construed as limiting the present invention.

Moreover, the terms "first" and "second" are used for descriptive purposes only and are not to be construed as indicating or implying a relative importance or implicitly indicating the number of the technical feature indicated. Thus, a feature defined by "first" and "second" may include one or more said features either explicitly or implicitly. In the description of the present invention, the meaning of "a plurality of" is two or more, unless expressly and specifically defined otherwise.

Referring to FIG. 1 to FIG. 4 in combination, the particle projection spatial imaging system provided by the present invention will now be described. The particle projection spatial imaging system includes a particle beam, a particle source 1, a deflection coil set 2, a particle exciting coil set 4, and a scan control mechanism (not shown in the figures). The particle source 1 is used to generate and accelerate the particle beam such that the particle beam has a certain initial velocity, and the particle source 1 emits the particle beam in a high frequency pulsed manner such that the particle beam enters the deflection coil set 2. Preferably, the particle beam is an electron beam, which is light in mass relative to other particles, more easy to obtain under the current engineering conditions, and more easy to accelerate, and the radiation effect generated after dynamic electrons are excited is also more noticeable than that with other heavy particles. Accordingly, the particle source 1 can be an electron gun, a particle accelerator or a storage ring, and the particle source 1 can generate electrons and impart to the electrons a certain initial velocity. Preferably, the particle beam is emitted from the particle source 1 in the form of a particle cluster and in a pulsed manner, to achieve precise control of positioning of spatial pixel points. The deflection coil set 2 is used to scan and deflect the accelerated particle beam, and deflect the accelerated particle beam to form a dynamic 3D particle array. The cross-section of the array is a two-dimensional closed cross-section, and the mode in which the cross-section is scanned can be two-dimensional planar scan. The deflected particles move along their preset trajectory to a pixel point in the magnetic field region generated by the particle exciting coil set 4, the particle exciting coil set 4 excites each particle bunch reaching a predetermined pixel point within a display region 5 in the manner of scanning magnetic pulses to cause it to generate a radiation effect, in which the particles are excited to emit light so as to illuminate the pixel point, and the 3D particle array region in the magnetic field is the display region 5. The display region 5 includes a plurality of spatial pixel points therein, and incident particle bunches can reach corresponding predicted spatial pixel points under the action of the scan control mechanism, and then be excited to illuminate. Due to dispersion of the pixel points, under the control of the scan control mechanism, pixels of several pixel points can be excited simultaneously using a single magnetic pulse to save scanning time overhead. The particle projection spatial imaging system, independent of any solid medium, may generate a dynamic 3D image 6 in the air or in vacuum. The scan control mechanism can control the particle source 1, the deflection coil set 2, the second particle accelerator 3, and the particle exciting coil set 4. Specifically, the scan control mechanism controls the particle number of each mass, velocity and energy of the currently-emitted particle beam via the particle source 1, and scans and controls the deflection angle of each electron bunch via the deflection coil set 2, thereby dynamically adjusting the displayed 3D image 6, and besides, can change the luminous spectrum of the stimulated radiation by adjusting the velocity of the particle beam and the intensity of the magnetic field generated by the deflection coil set 2, so as to generate a chromatic image or a monochrome image. The scan control mechanism has to predict the time when each particle bunch, after being deflected and scanned by the deflection coil set 2, reaches a predetermined spatial pixel point, thereby activating the particle exciting coil set 4 at the appropriate time to excite particles reaching the spatial pixel point and illuminate the pixel point by means of dynamic particle radiation effect.

In comparison with the prior arts, the particle projection spatial imaging system provided by the present invention generates a 3D spatial image by providing the particle source 1 to accelerate the particle beam, using the deflection coil set 2 to deflect the particle beam to form a particle beam of a dynamic particle array, generating a magnetic field in the display region 5 by the particle exciting coil set 4, and exciting the particle beam to cause radiation thereof, without relying on a solid display medium. Further, the scan control mechanism can control the particle number, velocity, and energy of the particle beam emitted by the particle source 1, and can also control the deflection angle of the particle beam caused by the deflection coil set 2 and the particle exciting coil set 4, the time when the particle beam reaches the display region 5, etc., thereby generating the dynamic 3D image 6.

Referring to FIG. 1 to FIG. 4 in combination, as a specific embodiment of the particle projection spatial imaging system provided by the present invention, the particle projection spatial imaging system further includes a second particle accelerator 3, the second particle accelerator 3 is disposed between the deflection coil set 2 and the display region 5, and can perform secondary acceleration on the deflected particle beam to compensate for a loss in energy of the particles during scanning and deflection, and the particle beam, after passing through the second particle accelerator 3, enters the display region 5. The second particle accelerator 3 may be a linear accelerator, an electro-static accelerator, a laser accelerator, a multivoltage accelerator, or the like. Of course, in the particle projection spatial imaging system, in some cases where the particle source 1 itself includes a particle accelerator or a storage ring and the deflection angle is not too large, the second particle accelerator 3 may not be used, and the particle deflection radius of the deflection coil set 2 may be extended by adjusting various parameters of the particle source 1, causing the particle beam that has been scanned and deflected by the deflection coil set 2 to directly enter the display region 5.

Further referring to FIG. 1 to FIG. 4, as a specific embodiment of the particle projection spatial imaging system provided by the present invention, the deflection coil set 2 includes a set of vertical yokes 21 disposed in a first direction, and a set of horizontal deflection yokes 22 disposed in a second direction, and the first direction and the second direction are set to be at a first predetermined included angle. Preferably, the first predetermined included angle is 90°, and specifically, the first direction is a vertical direction and the second direction is a horizontal direction. The vertical yokes 21 generate a magnetic field which varies periodically in the vertical direction, such that the particle beam is scanned in the vertical direction, and the horizontal deflection yokes 22 generate a magnetic field which varies periodically in the horizontal direction, such that the electron beam is scanned in the horizontal direction. Under the action of the deflection coil set 2, the electron beam can be deflected to a predetermined scan line.

Figure 4:
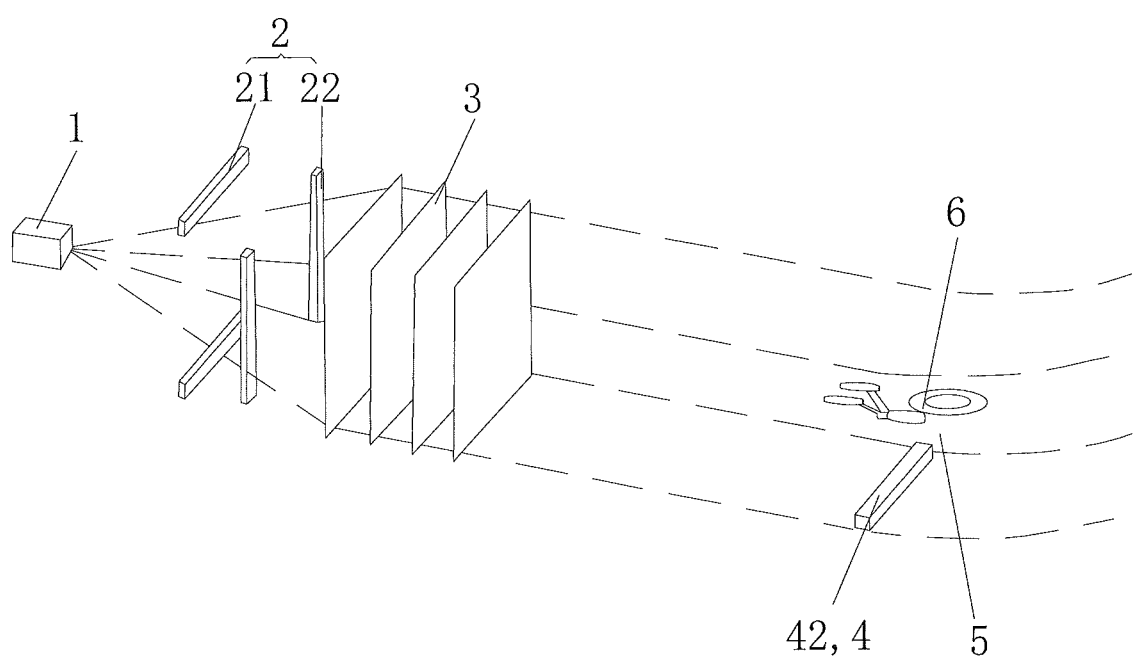
FIG. 4 is a schematic structural diagram IV of a particle projection spatial imaging system according to an embodiment of the present invention.

Referring to FIG. 1 and FIG. 4, as a specific embodiment of the particle projection spatial imaging system provided by the present invention, when the particles used are non-relativistic particles, the display region 5 composed of a scan line matrix is a rectangular parallelepiped, and the particle beam generates cyclotron radiation under the excitation of the particle exciting coil set 4, in which the image is almost omnidirectional in terms of the angle of view, and is isotropic. The difference between the radiation intensity of the particle beam on the front face of the display region 5 and the radiation intensity on the sides of the display region 5 is not large, and for an observer, the radiation intensity at a single angle of view is almost homogeneous, with an average radiation power being $P=4/9(\gamma_0^2 c\beta^2=\beta^2)=1.1\times10^{-15}\beta^2 B^2$ erg/s, $$\gamma_0 = \frac{e^2}{m_0 c^2},$$

where $\gamma_0$ is the classical radius of an electron, c is the velocity of light, $$\beta = \frac{v}{c}$$

is the ratio of the particle velocity to the velocity of light, B is the intensity of the magnetic field, $m_0$ is the rest mass of an electron, and e is the charge of an electron. The formula is erg/second in unit. The frequencies of the cyclotron radiation fall almost all on its fundamental frequency, with the fundamental frequency of the cyclotron radiation being $$\omega_0 = \frac{eB}{m_0 c\gamma} = 1.8 \times 10^7 \; B/s,$$

where $\gamma = \sqrt{1-\beta^2}$, and thus the monochromaticity of the radiated light of the cyclotron radiation is fairly good. In this embodiment, the excitation of the particle radiation by the particle exciting coil set 4 belongs to pulsed momentary excitation of a particular pixel point, in which a uniform magnetic field can be considered to exist in the vicinity of the particular pixel point.

Figure 3:
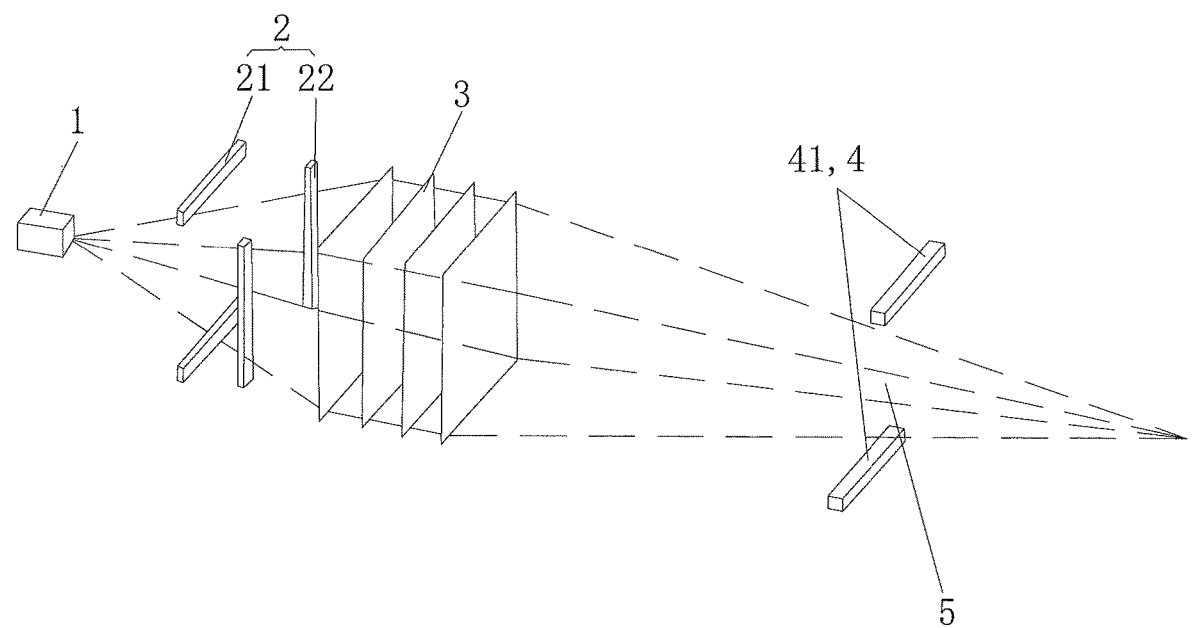
FIG. 3 is a schematic structural diagram III of a particle projection spatial imaging system according to an embodiment of the present invention.

Referring to FIG. 3, as a specific embodiment of the particle projection spatial imaging system provided by the present invention, when the particle beam used is a relativistic particle beam, the display region 5 composed of a scan line matrix is a square pyramid in shape, and an observation area is at the vertex of the square pyramid. When the relativistic particle beam is excited, the generated radiation is synchrotron radiation. Since the synchrotron radiation is extremely highly directional and is strong in radiation intensity, in this embodiment the image projected in the display region can only be observed near a specific point of the observation area, and no any image can be seen in other directions and positions. The average radiation power of the synchrotron radiation is $P=4/9(\gamma_0^2 c\gamma^2\beta^2 B^2)=1.1\times10^{-15}\gamma^2\beta^2 B^2$ erg/s, the fundamental frequency spectrum of the synchrotron radiation is $$\upsilon_0 \approx \frac{C}{2\pi}\rho,$$

and the peak frequency is $$\upsilon_c \approx \frac{3}{2(\gamma^3\upsilon_0)},$$

where ρ is the radius of curvature of the electron motion.

Figure 2:
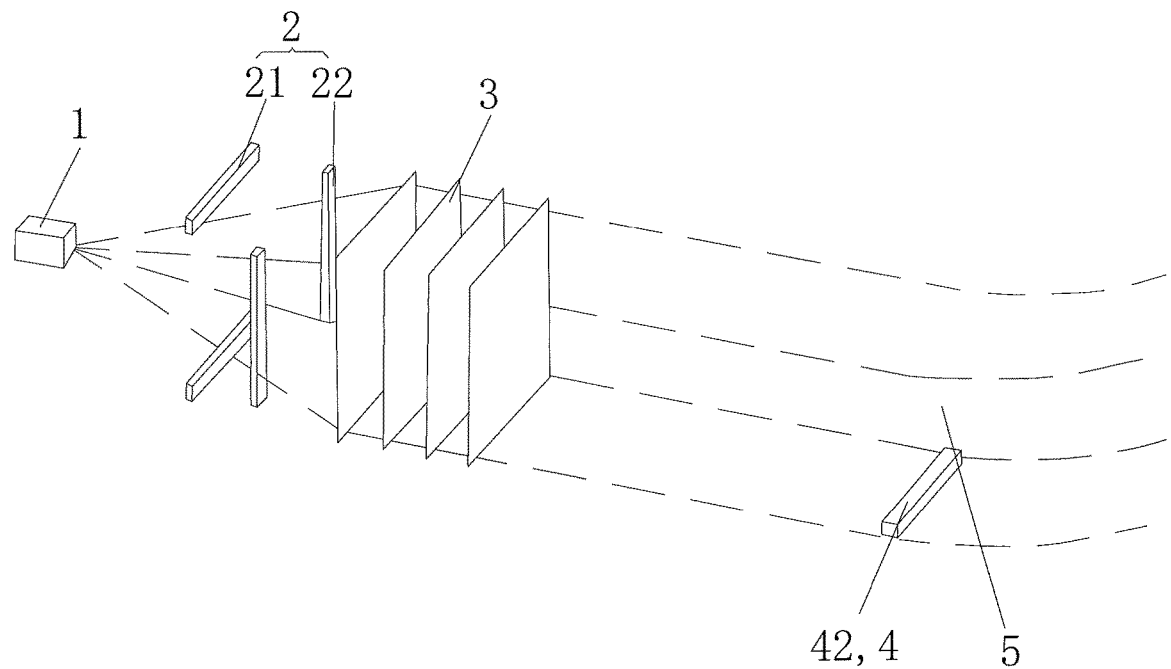
FIG. 2 is a schematic structural diagram II of a particle projection spatial imaging system according to an embodiment of the present invention.

Referring to FIG. 1 and FIG. 2, as a specific embodiment of the particle projection spatial imaging system provided by the present invention, the particle exciting coil set 4 is an undulator 41 or a deflection magnet 42. As shown in FIG. 1, the use of the undulator 41 to excite the particles limits the size of the displayed image and affects the observation angle, but the magnetic field generated by the undulator 41 is good in linearity. As shown in FIG. 2, the magnetic field generated by a single deflection magnet 42 is relatively weak and is relatively poor as to the linearity of the run of the lines of magnetic force, imposing higher requirements on the scan control mechanism.

Further referring to FIG. 1 to FIG. 4, as a specific embodiment of the particle projection spatial imaging system provided by the present invention, the display region 5 has a back face, a front face corresponding to the back face, and left, right, upper and lower sides adjacent to the back face, the particle beam passes through the back face of the display region 5 and enters, the particle exciting coil set 4 is disposed on one or more of the left, right, upper and lower sides of the display region 5, and the scan control mechanism controls the particle exciting coil set 4 to scan in a pulsed manner and excite the particle beam to generate cyclotron radiation or synchrotron radiation when the particle beam reaches a predetermined spatial pixel point, thereby illuminating the pixel point, and can deviate the electron beam away from the front observation area to prevent an observer in the front observation area from being irradiated by the particle beam.

Further referring to FIG. 1 to FIG. 4, as a specific embodiment of the particle projection spatial imaging system provided by the present invention, since each predetermined spatial pixel point has a different position and the time taken for an electron beam to reach the corresponding spatial pixel point is different, by controlling the speed of the electron beam by means of the scan control mechanism, it is possible to make electron beams directed towards several spatial pixel points reach targeted pixel points simultaneously, and then the particle exciting coil set 4 excites the electrons to illuminate the spatial pixel points, resulting in simultaneous scanning of multiple points instead of point-by-point scanning, which greatly saves the projection time, and the time consumption in scanning by the system can be close to that of a two-dimensional scanning system.

Further referring to FIG. 1 to FIG. 4, as a specific embodiment of the particle projection spatial imaging system provided by the present invention, the particle projection spatial imaging system further includes a vacuum casing that is vacuum inside, and the particle source 1, the deflection coil set 2, and the second particle accelerators 3 are all disposed in the vacuum casing. The vacuum inside the vacuum casing minimizes the loss of the particle beam due to transmission in the air as far as possible. On the vacuum casing, the exit surface of the particles employs a low-density material to reduce its resistance to the particles. Although the nucleus of an atom of a low-density material will induce bremsstrahlung to a particle cluster passing through it, its hindrance effect is negligible relative to the number of particles of the whole particle cluster.

Further referring to FIG. 1 to FIG. 4, as a specific embodiment of the particle projection spatial imaging system provided by the present invention, the magnetic field generated by the particle exciting coil set 4 is set to be at a second predetermined included angle with respect to the particle beam, causing the particle beam to generate a radiation effect. Preferably, the second predetermined included angle is 90°, in which case the radiation effect of the particle beam is maximized.

Further referring to FIG. 1 to FIG. 4, as a specific embodiment of the particle projection spatial imaging system provided by the present invention, the scan control mechanism dynamically adjusts the energy of the spatially-scanned particle beam, the particle number of the particle bunch, the magnetic field intensity of the particle exciting coil set 4 and the like, and can change the wavelength and the average radiation power of the radiation to obtain a chromatically displayed 3D image 6. In the case of displaying a large image or a high-definition image, for some instances, in order to save scanning time to avoid being short of time for scanning, it is possible to use a plurality of systems which share a set of particle exciting coils. In addition, by adjusting the intensity and emission angle of the particle beam, and using a multiple projection system and an infrared tracking system, where blocking of the particle beam by complex motions of a user is avoided, the user is allowed to perform interactive operations on a spatial image, performing creating, adding, modifying, deleting, sectioning, rotating, twisting, stretching operation and the like on the spatial image.

Referring to FIG. 1 to FIG. 4, as a specific embodiment of the particle projection spatial imaging system provided by the present invention, in this embodiment, for a common non-perspective image, it is only necessary for the particle beam to perform scanning of a two-dimensional cross-sectional boundary of the 3D image. Likewise, it is only necessary for the magnetic field to excite the spatial pixel points of the surface of the 3D image 6, without needing to illuminate the spatial pixel points inside the 3D image 6. In this case, in the two-dimensional planar scanning of the particle beam, areas in the cross-section of the 3D image 6 without image boundaries can be omitted, and it is only necessary to perform the boundary scanning of the stereo image, which saves the scanning time and hardware resources, thereby increasing the dot matrix density of the 3D image 6, projecting a clearer object and promoting the smoothness of the dynamic image variation under the same hardware and software condition.

The above is only preferred embodiments of the present invention, and is not intended to limit the present invention, and any modification, equivalent substitution, improvement and the like made within the spirit and principles of the present invention shall be included in the protection scope of the present invention.

The invention claimed is:

1. A particle projection spatial imaging system, characterized by a particle source for generating and accelerating a particle beam, a deflection coil set for scanning the accelerated particle beam and deflecting it to form a dynamic 3D particle array, an exciting coil set for generating an exciting magnetic field, and a scan control mechanism for controlling the particle source, the deflection coil set and the exciting coil set, wherein the exciting magnetic field generated by the exciting coil set excites particles in the dynamic 3D particle array, and the particles, upon stimulated radiation, generate a luminous effect and generate pixel points, forming a spatial stereoscopic image due to persistence of vision of human eyes; and wherein a 3D particle array region located in the exciting magnetic field is a display region.

2. The particle projection spatial imaging system according to claim 1, characterized in that the deflection coil set comprises a set of vertical yokes disposed in a first direction, and a set of horizontal deflection yokes disposed in a second direction, the first direction and the second direction being set to be at a first predetermined included angle.

3. The particle projection spatial imaging system according to claim 1, characterized in that it further comprises a second particle accelerator disposed between the deflection coil set and the display region.

4. The particle projection spatial imaging system according to claim 3, characterized in that the second particle accelerator can be a linear accelerator, an electro-static accelerator, a laser accelerator, a multivoltage accelerator, or the like, and the second particle accelerator is used to compensate for a loss in energy of the particle beam after being deflected by the deflection coils.

5. The particle projection spatial imaging system according to claim 1, characterized in that the display region has a back face for receiving the particle beam, a front face corresponding to the back face, and left, right, upper and lower sides adjacent to the back face, and the particle exciting coil set is disposed on one or more of the left, right, upper and lower sides and/or the front face of the display region.

6. The particle projection spatial imaging system according to claim 1, characterized in that it further comprises a vacuum casing that is vacuum inside, and the particle source and the second particle accelerator are all disposed in the vacuum casing.

7. The particle projection spatial imaging system according to claim 1, characterized in that a direction of the exciting magnetic field generated by the particle exciting coil set is set to be at a second predetermined included angle with respect to a direction of flight of the particle beam.

8. The particle projection spatial imaging system according to claim 7, characterized in that the second predetermined included angle is 90°.

9. The particle projection spatial imaging system according to claim 1, characterized in that the particle exciting coil set is a deflection electromagnet or an undulator.

10. The particle projection spatial imaging system according to claim 1, characterized in that the particle beam is an electron beam.

* * * * *